(12) United States Patent
Ghosh et al.

(10) Patent No.: US 7,771,682 B2
(45) Date of Patent: Aug. 10, 2010

(54) PROCESS FOR THE PREPARATION OF MAGNESIA (MGO) FROM CRUDE MG (OH)$_2$

(75) Inventors: Pushpito Kumar Ghosh, Gujarat (IN); Himanshu Labhshanker Joshi, Gujarat (IN); Hasina Hajibhai Deraiya, Gujarat (IN); Maheshkumar Ramniklal Gandhi, Gujarat (IN); Rohit Harshadrai Dave, Gujarat (IN); Kaushik Jethalal Langalia, Gujarat (IN); Vadakke Puthoor Mohandas, Gujarat (IN)

(73) Assignee: Council of Scientific and Industrial Research, Rafi Marg, New Delhi (IN)

( * ) Notice: Subject to any disclaimer, the term of this patent is extended or adjusted under 35 U.S.C. 154(b) by 730 days.

(21) Appl. No.: 11/376,707

(22) Filed: Mar. 15, 2006

(65) Prior Publication Data
US 2007/0191214 A1    Aug. 16, 2007

(30) Foreign Application Priority Data
Jan. 31, 2006    (IN)    ............... 0258DEL2006

(51) Int. Cl.
*C01F 1/00* (2006.01)
*C01F 5/26* (2006.01)
*C01F 11/02* (2006.01)
*C01B 13/14* (2006.01)
*C01B 3/08* (2006.01)

(52) U.S. Cl. ............... 423/160; 163/164; 163/166; 163/636; 163/658; 163/640

(58) Field of Classification Search ............... 423/160, 423/163, 164, 166, 636, 658, 640
See application file for complete search history.

(56) References Cited

U.S. PATENT DOCUMENTS 2,893,840 A * 7/1959 Vettel et al. ............... 423/160

(Continued)

FOREIGN PATENT DOCUMENTS

| CN | 1332117 A | 1/2002 |
|---|---|---|
| DE | 10154004 A1 | 5/2003 |
| JP | 60042271 | * 3/1985 |

OTHER PUBLICATIONS

Transaction History from Patent Application Information Retrieval for commonly owned U.S. Appl. No. 11/375,246, 1 page.

(Continued)

*Primary Examiner*—Jerry Lorengo
*Assistant Examiner*—Shuangyi Abu Ali
(74) *Attorney, Agent, or Firm*—Brinks Hofer Gilson & Lione

(57) ABSTRACT

The process provides for the preparation of MgO from the reaction of magnesium salt and alkali/lime. The crude Mg(OH)$_2$ is directly calcined and then treated with water to disintegrate the mass spontaneously to yield a slurry and dissolve away the soluble salts. This slurry is much easier to filter and wash than the original Mg(OH)$_2$ slurry, which helps to speed up the purification operation and also conserve fresh water. Another important advantage of the present method is that even pasty or dough like reaction products that are processed using dough mixers and similar equipment can be worked up with ease. There is no compromise in the quality of MgO achieved in this manner.

28 Claims, 4 Drawing Sheets

Powder XRD of MgO (99.43% Purity) of Example 1 prepared by the improved process

Powder XRD of MgO (96.15% Purity) of Example 1 prepared by conventional process

U.S. PATENT DOCUMENTS

| | | | | |
|---|---|---|---|---|
| 3,232,708 | A * | 2/1966 | Edward | 423/161 |
| 3,690,844 | A | 9/1972 | Neitzel et al. | |
| 3,800,032 | A * | 3/1974 | Eberle et al. | 423/636 |
| 3,852,044 | A | 12/1974 | Neitzel et al. | |
| 3,987,135 | A * | 10/1976 | Eigner et al. | 264/658 |
| 4,033,778 | A * | 7/1977 | Gilpin et al. | 501/114 |
| 4,117,078 | A * | 9/1978 | Kunze | 423/163 |
| 4,229,423 | A * | 10/1980 | Housh et al. | 423/164 |
| 4,255,399 | A | 3/1981 | Grill et al. | |
| 4,693,872 | A * | 9/1987 | Nakaya et al. | 423/164 |
| 4,695,445 | A | 9/1987 | Nakaya et al. | |
| 4,698,379 | A | 10/1987 | Nakaya et al. | |
| 5,039,509 | A * | 8/1991 | Miyata et al. | 423/636 |
| 5,705,141 | A * | 1/1998 | Dumont et al. | 423/640 |
| 6,776,972 | B2 * | 8/2004 | Dave et al. | 423/166 |
| 2007/0219081 | A1 | 9/2007 | Dave et al. | |

OTHER PUBLICATIONS

Office Action from Patent Application for Commonly Owned U.S. Appl. No. 11/375,246, 14 pages.

"Magnesite," in Indian Minerals Year Book, vol. 2, 1989, published by Indian Bureau of Mines, Nagpur, pp. 690 to 703, 17 pages (see pp. 698-699).

"Magnesium Compounds" in Kirk-Othmer Encyclopedia of Chemical Technology, Fourth Edition, 1995, vol. 15, pp. 675 to 722, 51 pages.

Ainscow, W.S., Aufbereitung von Magnesit zu Hochwertiger Sintermagnesia, TIZ-Fachberichte vol. 110, No. 6, 1986, pp. 363 to 368, 7 pages, "Sulmag II the Sinter Magnesite Process," Sulzer Brothers Ltd., Winterthur, Switzerland.

Evans, Robert L., et al., "Carbonation of Aqueous Suspensions Containing Magnesium Oxides or Hydroxides," in "Industrial and Engineering Chemistry" vol. 41, No. 12, Dec. 1949, pp. 2814-2817, 4 pages.

Fernandez-Lozano, J.A., "Utilization of Seawater Brines for the Production of High Purity Magnesium Oxide and Magnesium Hydroxide," Proceedings of the Fifth International Symposium on Salt—Northern Ohio Geological Society, 1979, pp. 269-279, 13 pages.

Gilpin, W.C., et al., "Resources From the Sea-Minerals", in "Chemical and Industry", Jul. 16, 1977, pp. 567 to 672, 7 pages.

Kemin, Li, et al., "Preparation of magnesium hydroxide Flame Retardant By Ammonia Method," in "Inorganic Chemicals and Reactions," 1 Wujiyan Gongye Bianjib, CA 135:115882; CA Section: 78, (Chinese) 2001,pp. 14 to 16.

Strelets, Kh. L., "Electrolytic Production of Magnesium," translated from Russian by Keter Publishing House Jerusalem Ltd., 1977, 1 to 325, 335 pages (see p. 28).

Thorp, H.W., et al., "Chemical Engineering Problems in the Sea Water Magnesia Process," in "Society of Chemical Industry," Proceedings vol. XXXI, 1949, pp. 46-58, 15 pages.

Updated Transaction History dated Apr. 8, 2009, from Patent Application Information Retrieval for commonly owned U.S. Appl. No. 11/375,246.

Response to Office Action for U.S. Appl. No. 11/375,246 dated Jul. 25, 2008.

Notice of Allowance for U.S. Appl. No. 11/375,246 issued on Dec. 8, 2008.

* cited by examiner

Fig. 1(A) Powder XRD of MgO (99.43% Purity) of Example 1 prepared by the improved process Fig. 1(B) Powder XRD of MgO (96.15% Purity) of Example 1 prepared by conventional process Fig. 2 Powder XRD of MgO (95.14% purity)

Figure 3. Powder XRD patterns of (A) Crude MgO of Example 6 (after initial calcination at 600°C), (B) purified product obtained through washing with water followed by drying at 110°C, and (C) purified MgO having 99.13% purity obtained after recalcination at 900°C.

PROCESS FOR THE PREPARATION OF MAGNESIA (MGO) FROM CRUDE MG (OH)$_2$

RELATED APPLICATIONS

This patent application claims priority under 35 U.S.C. §119 to Indian Patent Application No. 0258DEL2006 filed on Jan. 31, 2006.

FIELD OF THE INVENTION

The present invention relates to preparation of pure magnesia (MgO) from crude Mg (OH)$_2$. More particularly, the invention relates to preparation of such MgO without subjecting the Mg(OH)$_2$ to elaborate washing as practiced in the prior art and, instead, lightly calcining the crude mass to obtain a readily filterable material which is easier to purify.

BACKGROUND OF THE INVENTION

Magnesia is an important compound that finds application in various industries. Magnesium oxide has the highest melting point of the moderately priced oxides and is therefore an important raw material for refractory bricks and other materials. It is the only material apart from ZrO$_2$ that can withstand long-term hearing above 2000° C.

Reference may be made to Ullmann's Encyclopedia, 6$^{th}$ Edition (electronic version) wherein it is stated that: "The increased demands made on refractory materials as a result of higher operating temperatures and shorter tap to tap times in metallurgical furnaces and reactors can only be met by pure, high-density magnesia sinters." Small quantities of "contaminants" are disadvantageous if they form low-melting eutectics with MgO (e.g., with CMS at 1485° C. or with C$_2$F at 1200° C. because this leads to deterioration of mechanical properties (e.g., strength and volume stability) at high temperatures. High-quality sinters therefore have a low content of high-melting silicate phases (such as C$_2$S), a low B$_2$O$_3$ content, and a high degree of direct periclase-periclase contact (without intermediate silicate phases).

Magnesia bricks have a high heat storage capacity and a high thermal conductivity. They are used in efficient off-peak storage heaters. The heat generated by a heating element is transferred to the magnesia brick and increases its temperature. Thermal conductivity is increased by a high periclase content and a low porosity. The specific heat is only slightly lowered by SiO$_2$ and Al$_2$O$_3$, but is significantly lowered by CaO, Cr$_2$O$_3$, and Fe$_2$O$_3$. The bricks should not contain free CaO (risk of hydration) or crystal phases with different modifications.

Caustic magnesia was formerly produced exclusively from cryptocrystalline magnesite with a low iron content but is now also obtained from all types of magnesite and Mg(OH)$_2$. Its MgO content ranges from ca. 65 to 99 wt %, and may even reach 99.9%. The magnesia is often ground prior to use. Extremely reactive caustic magnesia may have a surface area of up to 160 m$^2$/g. Depending on the burning temperature, the product is termed light burned (870-1000° C.) or hard burned (1550-1650° C.). Light-burned, caustic magnesia becomes hydrated in cold water and is soluble in dilute acid. It has a loose bulk density of 0.3-0.5 g/cm$^3$ and a specific surface area (BET) of 10-65 m$^2$/g. Hardburned caustic magnesia has a loose bulk density of 1.2 g/cm$^3$ (bulk density 2 g/cm$^3$).

MgO can be pressure hydrated to form Mg(OH)$_2$. It can also be converted into anhydrous MgCl$_2$ through the reaction of eq. 1 (*Electrolytic Production of Magnesium*, Kh. L. Strelets, Keter Publishing House Jerusalem Ltd., 1977, p28)

$$MgO+Cl_2+CO \rightarrow MgCl_2+CO_2+70.8 \text{ cal/mole} \quad (eq. 1)$$

and the anhydrous MgCl$_2$ can be converted into Mg and Cl$_2$ by electrolysis (eq. 2)

$$MgCl_2 \rightarrow Mg+Cl_2 \quad (eq. 2).$$

Alternatively, MgO can be thermally reduced to obtain Mg.

Reference is made to Ullmann's Encyclopedia wherein it is reported that magnesia can be prepared by the decomposition of magnesite (MgCO$_3$). The main drawback of this method is that magnesite ore can have high levels of impurity. The highest quality magnesites, particularly those for refractory applications, are needed for a magnesia product with a high MgO content, a CaO:SiO$_2$ mass ratio of 2-3, and low contents of Fe$_2$O$_3$ and Al$_2$O$_3$. The presence of accompanying, low-melting minerals can adversely affect the properties of the sintered magnesia.

Reference may also be made to a publication entitled "Magnesite-A market survey" published by Indian Bureau of Mines, Nagpur and "Magnesite" in Indian Minerals Year Book, Vol.-2 (1989) published by Indian Bureau of Mines, Nagpur, pages 698 to 699, wherein magnesia is prepared by calcination of naturally occurring magnesite deposits. The drawback of this process is that magnesite ores contain varying amount of silica, iron oxide, alumina, and lime as silicates, carbonates, and oxides. Selectively mined ore is passed through various beneficiation methods like crushing and size separation, heavy media separation, and froth flotation to reduce lime and silica content prior to calcination. Magnetic separation reduces iron concentration but is effective only when the iron is present in the form of discrete ferromagnetic minerals rather than as ferrous carbonate. Due to all this, high purity magnesia is difficult to produce by this process.

Reference is made to the Sulmag II process (W. S. Ainscow: "Aufbereitung von Magnesit zu hochwertiger Sintermagnesia," TIZ 110 (1986) no. 6, 363-368. *Sulmag II the Sinter Magnesite Process*, Sulzer Brothers Ltd., Winterthur, Switzerland) for producing light-burned caustic magnesia in a gas suspension kiln from low-magnesite ores. Dissolved magnesium chloride is obtained by selective extraction with recycled NH$_4$Cl solution (eqs. 3, 4) and all insoluble impurities are removed through filtration. Needle-shaped crystals of nesquehonite (MgCO$_3$.3H$_2$O) are precipitated out in the reactor and filtered (eq. 5). Caustic magnesia with a high specific surface area is obtained by heating the nesquehonite.

$$MgCO_3 \rightarrow MgO+CO_2 \quad (eq. 3)$$

$$2NH_4Cl+MgO+H_2O+Contaminants \rightarrow 2NH_4OH+MgCl_2+Tailings \quad (eq. 4)$$

$$MgCl_2+(NH_4)_2CO_3+3H_2O \rightarrow MgCO_3.3H_2O\downarrow+2NH_4Cl \quad (eq. 5)$$

The above process has many advantages but would give product of very low bulk density which may not be suitable in refractory applications, which comprises the bulk of applications related to magnesia.

Reference may also be made to the technique of pyrohydrolysis. MgCl$_2$-rich brine is purified to remove bromide and traces of boron and then fed via steel pipes into the spray nozzles of the reactor. It is sprayed into the cylindrical, externally insulated reactor at ca. 600° C. The water evaporates from the atomized brine droplets leaving a perforated chloride crust which reacts with the steam to form MgO and HCl. The crude product is washed with water and hydrated in a stirred tank, and then concentrated in a thickener. The resulting slurry is difficult to filter and is washed and dewatered in a two-stage vacuum drum filter. The calcined product typically contains ≧99.5 wt % MgO, <1 wt % CaO, ≦0.05 wt %

$SiO_2$, $\leqq 0.05$ wt % $Fe_2O_3$, $\leqq 0.005$ wt % $Al_2O_3$, and $\leqq 0.01\%$ $B_2O_3$; its specific surface area is 2-50 m²/g, the loose bulk density ranges from 0.8 to 0.2 g/cm³. The main drawback is that spray calcination is an energy intensive process and choking up of nozzles can pose a problem. Another drawback is that the MgO obtained after first calcination leads to a slurry that is indicated to be "difficult to filter" which would largely offset any advantage that might be gained.

Reference may be made to the U.S. Pat. No. 4,255,399 dated Mar. 10, 1981 entitled "Process for the Recovery of Magnesium Oxide of High Purity" by Grill et. al, wherein magnesium oxide is obtained by thermal decomposition of a magnesium chloride brine previously purified. Concentrated magnesium chloride is decomposed in a thermal reactor where hot gases convert it into magnesium oxide and hydrochloric acid. The problems no doubt would be similar to those stated above.

Reference is made to U.S. Pat. No. 6,776,972, dated Aug. 17, 2004, wherein Vohra et al. have described the use of HCl gas generated from spray pyrolysis for reaction with limestone to prepare $CaCl_2$ which can then be used to desulfate sea/sub-soil bittern for the facile production of carnallite double salt wherefrom KCl can be produced. The problem of spray calcination, however, remains.

Reference may be made to "Preparation of magnesium hydroxide flame retardant by ammonia method," by Li, Kemin; Zhang, Li; Wujiyan Gongye, (33(2), 14-16 (Chinese) 2001 Wujiyan Gongye Bianjib, CA 135:115882; CA Section: 78 (Inorganic Chemicals and Reactions), wherein the flame retardant was prepared by allowing bittern after recycling $K_2SO_4$ to react with $NH_4OH$, hydrothermal treatment to obtain $Mg(OH)_2$, treating by surface treatment, washing, drying, and crushing. The content of $Mg(OH)_2$ of the flame retardant was 97%. No mention is made of any process that produces MgO from the crude unwashed $Mg(OH)_2$.

Reference may be made to "Recovery of magnesium hydroxide, gypsum and other products from natural and technical brines, in particular from final lyes of potash works" by Krupp, Ralf (Germany) (Ger. Offen. DE 10154004 Al 15 May 2003, 9 pp. (German); CA 138:371080), wherein, recovery of $Mg(OH)_2$ and gypsum from $MgSO_4$- and $MgCl_2$-containing brines results by precipitation of Mg-ions with $NH_3$ or $NH_4OH$. Gaseous $NH_3$ is recovered by addition of CaO and recycled for the precipitation step. The method allows the manufacture of $Mg(OH)_2$ without impurities such as Fe, Mn, Al, and Ca. However, although not stated explicitly, the preparation of pure $Mg(OH)_2$ would no doubt have involved the washing of the solid to remove adhering $NH_4Cl$, $MgCl_2$, etc.

Reference may be made to "One-step process for manufacture of magnesium hydroxide" by Wang, Fuwen; Zhang, Jun; Liu, Jianhua; Dong, Yijun (Shandong Haihua Group Corp., Ltd., Peop. Rep. China). Faming Zhuanli Shenqing Gongkai Shuomingshu CN 1332117 A 23 Jan. 2002, 7 pp. (Chinese) (People's Republic of China). Bittern containing $MgCl_2$ and ammonium hydroxide[mol ratio of $MgCl_2$/ammonia=1/(1.3-2.0)] are reacted at 45-90° for 5-30 minutes, filtered, washed, dried, and pulverized to give solid magnesium hydroxide. No mention is made of the difficulties encountered in purifying $Mg(OH)_2$ besides the disadvantage of using ammonia vis-á-vis inexpensive lime. Seawater contains magnesium and has the inherent advantage of having virtually no silica contamination. Thus high quality $Mg(OH)_2$ can be produced mainly using seawater/brine/bittern of marine origin.

Reference may be made to the paper by J. A. Fernandez-Lozano entitled "Utilization of Seawater Brines for the Production of High Purity Magnesium Oxide and Magnesium Hydroxide" published in the Proceedings of the Fifth International Symposium on Salt—Northern Ohio Geological Society, 1979, pp 269-279 wherein the author has stated that $Mg(OH)_2$ obtainable from the reaction of $MgCl_2$-rich seawater brine and ammonia can be made of high purity by washing the hydroxide and that, in principle, MgO of high purity can be obtained as a result. No mention is made of the difficulties encountered in purifying $Mg(OH)_2$ besides the disadvantage of using ammonia vis-á-vis inexpensive lime.

Reference is made to the preparation of MgO from $Mg(OH)_2$ by calcination (eq. 6).

$$Mg(OH)_2 \rightarrow MgO + H_2O \qquad \text{(eq. 6)}$$

Reference is also made to Kirk Othmer, Encyclopedia of Chemical Technology, 4$^{th}$ Ed., Vol. 15, p 690 wherein it is stated that "To precipitate and recover magnesium hydroxide from solutions of magnesium salts, a strong base is added. The more commonly used base is calcium hydroxide derived from lime (CaO) or dolime (CaO—MgO)." Sodium hydroxide is used as a precipitant if a product having low CaO content is desired.

Reference may be made to the paper entitled "Carbonation of Aqueous Suspensions containing Magnesium Oxides or Hydroxides" by Robert L. Evans and Hillary W. St. Clair in "Industrial and Engineering Chemistry" 1949, 41(12), 2814-2817, wherein a modification of the Pattinson process (carbonation of magnesium hydroxide to magnesium bicarbonate) is described. A suspension of magnesium hydroxide is carbonated to form a metastable solution of magnesium bicarbonate. After the separation of insoluble impurities, the solution is decarbonated by heating or aeration and the magnesium carbonate precipitates as trihydrate, the penta hydrate or the basic carbonate. The precipitate is recovered from the solution by filtration and converted to magnesium oxide by thermal decomposition. The main drawback of the process is that the process is very sensitive to the partial pressure of carbon dioxide and to the temperature. The stability of the metastable solution of magnesium bicarbonate decreases markedly as the temperature rises above normal room temperature. Moreover, the bulk density of the MgO would be too low for refractory applications.

Reference may be made to the paper "Chemical Engineering Problems in the Sea Water Magnesia Process" read by H. W. Thorp and W. C. Gilpin at a meeting of the Chemical Engineering Group, held in the Apartment of the Geological Society, Burlington House, London, W. I. on Tuesday, Oct. 25, 1949 wherein the recovery of magnesia from sea water lies in the difficulty of precipitating the magnesium hydroxide in a form which will settle rapidly and which will yield a sludge easy to de-water. It is realized that each ton of magnesia must be separated from some 300 tons of water, which amount does not include any used for washing the precipitate. It is necessary to ensure the minimum contamination by lime; the sea water is treated prior to the removal of the magnesium hydroxide, with a small proportion of lime to precipitate the bicarbonate ion as calcium carbonate.

Reference is made to Ullmann's Encyclopedia wherein the production of MgO from seawater and brines is described such that 470 m³ of seawater are required to produce 1 t of MgO; and in practice 600 m³ are needed. The process is based on the precipitation of magnesium hydroxide (solubility in water 0.0009 wt %) by addition of calcium hydroxide (solubility 0.185 wt %):

$$Mg^{2+} + 2Cl^- + Ca(OH)_2 \rightarrow Mg(OH)_2 \downarrow + Ca^{2+} + 2Cl^-$$

The main drawbacks of the process are that a supply of freshwater (>40 m³ per tonne MgO) is required to wash the $Mg(OH)_2$ and to produce the milk of lime. High-purity limestone or dolomite deposits should be available in the vicinity; they are calcined and slaked to provide $Ca(OH)_2$ as the precipitating agent and should therefore contain minimal quantities of elements that form insoluble carbonates, sulfates, etc. The freshwater also requires to be decarbonated. Unless specially treated, caustic and sintered magnesia produced from seawater usually contain ca. 0.2% $B_2O_3$ and small amounts of CaO, $SiO_2$, $Al_2O_3$, and $Fe_2O_3$ derived from the limestone or wastes in the seawater. The $B_2O_3$ content of the magnesia is also generally lowered to ca. 0.05% by using a 5-12% excess of lime for precipitation (overliming); this increases the pH to 12 and minimizes the adsorption of boron. Apart from all the obvious drawbacks no mention is made of the difficulties of washing $Mg(OH)_2$ which problem is even more complex as a result of overliming.

Reference may also be made to the paper "Recovery of Magnesium Compounds from Sea Water" by W. C. Gilpin and N. Heasman in "Chemistry and Industry," 6 Jul. 1977, 567-572, wherein the process of recovering magnesia from seawater and the problems with the process are clearly outlined. The drawbacks of the process are similar to those described above.

It will be observed from the prior art that wherever $Mg(OH)_2$ has been used as intermediate in MgO manufacture, it is first purified to obtain pure $Mg(OH)_2$ prior to calcination to obtain MgO. Unfortunately, being slimy in nature, $Mg(OH)_2$ as obtained in the precipitation reaction is difficult to filter and purification becomes more and more difficult to attain high levels of purity.

SUMMARY OF THE INVENTION

The aim of one embodiment of the present invention is directed to provide an improved process for the preparation of MgO from $Mg(OH)_2$ wherein the key bottleneck of the conventional process, namely the tedious nature of purification to free the $Mg(OH)_2$ of impurities, is overcome by eliminating the washing of crude $Mg(OH)_2$, indeed even the need for its filtration in a special case of application of the invention, and instead lightly calcining the mass to convert the hydroxide into oxide which is more easily washable and filterable, thereby greatly reducing the need for fresh water while also speeding up the washing operation. The light calcination process also helps to convert adhering $MgCl_2$ into MgO. It is further demonstrated through the invention that residual salts in the MgO such as NaCl and $CaCl_2$ are not occluded irreversibly and that such salts are easily washed off with water, as a result of which the purity of MgO achievable is the same as that which can be realized through the elaborate process of prepurification of $Mg(OH)_2$ with large water consumption practiced in the prior art. Additional washing with suitable additives can simultaneously reduce boron impurity in the MgO. A simultaneous benefit is the high concentration of $CaCl_2$ achievable through this process which makes desulphatation more cost-effective by reducing the evaporation load post desulphatation. The washed MgO can be recalcined, if required, or it can be directly used in preparation of briquettes that can be then sintered to achieve refractory materials. The partially hydrolysed MgO can also be used for $Mg(OH)_2$ preparation through pressure hydrolysis as practiced in the prior art.

DETAILED DESCRIPTION OF PREFERRED EMBODIMENTS OF THE INVENTION

Accordingly, a preferred embodiment of the present invention provides an improved process for the preparation of MgO, the said process comprising the steps of:

i) desulphating brine or bittern with $CaCl_2$, ii) evaporating the clarified brine/bittern after separation of gypsum to separate out the common salt and carnallite ($KCl.MgCl_2.6H_2O$), iii) recovering $MgCl_2$ rich and other salt free end bittern from step (ii), iv) further evaporating end bittern of step (iii) to obtain crystalline $MgCl_2.6H_2O$, v) mixing $MgCl_2.6H_2O$ with seeds of $Mg(OH)_2$, followed by treating with alkali or hydrated lime/lime slurry to cause a precipitation reaction to obtain the crude $Mg(OH)_2$ paste/slurry, vi) optionally filtering resultant paste/slurry to obtain crude $Mg(OH)_2$ and calcium chloride, alternatively using crude $Mg(OH)_2$ paste as such without filtration, vii) drying the above crude $Mg(OH)_2$ paste, followed by calcination to convert $Mg(OH)_2$ into MgO, and converting adhering $MgCl_2$ into MgO and HCl gas, viii) optionally treating the calcined mass of MgO obtained in step (vii) with water to crumble the lumps and thereby dissolving calcium chloride and other soluble salts in water to obtain the slurry, ix) optionally filtering the above resultant slurry, followed by washing the residue with water to make it free from impurities, x) drying the above resultant wet cake residue containing mainly MgO and recalcinating it to obtain the desired highly purified MgO, and xi) using the $CaCl_2$ solution filtrate obtained in steps (vi) and (ix), for desulphatation of brine or bittern in step (i) if lime is used in step (v).

In an embodiment of the present invention, the bittern used in step (i) is obtained from ocean brine, sea brine, sub-soil brine or lake brine.

In yet another embodiment, the sulphate-containing bitterns used in step (i) are desulphated in the density range of 29-32° Be'.

In yet another embodiment, the carnallite ($KCl.MgCl_2.6H_2O$) obtained in step (ii) is crystallized between 32-36° Be' either through solar or forced evaporation and the end bittern of step (iii) having density of 35.5-36.0° Be' contains 450-460 $gL^{-1}$ of $MgCl_2$, 5-10 $gL^{-1}$ of NaCl, 5-10 $gL^{-1}$ of KCl, 5-15 $gL^{-1}$ of Ca, 0-5 $gL^{-1}$ of sulphate, 6-7 $gL^{-1}$ of Br, and 0.02-0.04% $B_2O_3$.

In yet another embodiment, the end bittern of step (iii) is used as such or preferably debrominated to recover bromine and simultaneously reduces the Br⁻ impurity in debrominated bittern to <0.5 $gL^{-1}$.

In yet another embodiment, the prestine end bittern of step (iii) can be used for MgO recovery or more preferably it can be debrominated and used without crystallization step of step (iv).

In yet another embodiment, the end bittern of step (iii) is evaporated in step (iv) to reduce the volume by 20-25% so as to crystallize out the $MgCl_2.6H_2O$ (60-80% yield) that is substantially free of the above salts and contains 0.020-0.015% $B_2O_3$ impurity.

In yet another embodiment, other soluble magnesium salts such as magnesium sulphate or magnesium nitrate can be used as source of magnesium.

In yet another embodiment, the alkali used in step (v) is lime, caustic soda and ammonia.

In yet another embodiment, the lime used in step (v) is selected from quicklime, hydrated lime, and dolime in solid or slurry form.

In yet another embodiment, the hydrated lime used in step (v) is prepared by slaking of quicklime followed by cycloning and dewatering to yield upgraded solid hydrated lime and lime water that can be reused for slaking of fresh batch of quicklime.

In yet another embodiment, the stoichiometric equivalent of alkali used in step (v) is in the range of 0.8-1.0.

In yet another embodiment, the amount of $Mg(OH)_2$ seed used in step (v) is in the range of 0-10% mole for mole of magnesium salt taken.

In yet another embodiment, the temperature of the precipitation reaction in step (v) is in the range of 20-120.

In yet another embodiment, the reaction time used in the precipitation reaction in step (v) is in the range of 5-90 minutes, under intimate mixing conditions.

In yet another embodiment, the drying of pasty mass obtained in step (vi) is carried out at 70-120° C. in conventional ovens or through solar drying.

In yet another embodiment, the calcination operation in step (vii) is carried out at a temperature in the range of 500-1000° C., preferably 600-900° C., and preferably in a muffle furnace or rotary calciner or vertical kiln depending on the physical form of the dry matter.

In yet another embodiment, the calcination operation in step (vii) converts adhering $MgCl_2$ into MgO with concomitant release of HCl vapour and $CaCl_2.6H_2O$ into fused $CaCl_2$ that is hydrated with release of heat and provides the driving force for the disintegration of the crude mass and also the rapid solubilisation of the $CaCl_2$.

In yet another embodiment, the water used in step (viii) is largely comprises the recycled washings from previous batches and the amount of water taken is sufficient to dissolve all soluble salts in the MgO and also ensure the temperature of the slurry is controlled at a temperature of 40-90° C., preferably in the range of 55-65° C., for the higher solubility of salts such as $CaCl_2$ at higher temperature and to minimize the hydrolysis of MgO.

In yet another embodiment, the water used in steps (viii) and (ix) optionally contains additives to remove boron impurities in MgO or without having additives.

In yet another embodiment, the washing and filtration operations of step (ix) are expedited 2-5 fold as a result of the improved filterability of the lightly calcined MgO vis-á-vis $Mg(OH)_2$.

In yet another embodiment, the requirement of water for purification of the calcined mass in step (ix) is reduced by a factor of 2-5 fold as a result of the improved filterability of the lightly calcined MgO vis-á-vis $Mg(OH)_2$.

In yet another embodiment, the wet cake obtained in step (vii) is useful for the preparation of milk of magnesia.

In still another embodiment, the wet cake obtained in step (vii) is dried to yield MgO or recalcined at a temperature in the range of 500-2200° C. to obtain the desired product.

In yet another embodiment, when the alkali used in step (v) is ammonia, the calcinations operation of step (vii) removes all impurities to yield highly pure MgO and helps avoid the operation of steps (viii) and (ix).

In yet another embodiment, the speed of the work up and saving of fresh water is not at the expense of quality and MgO having similar purity to that obtained through the conventional process of work up of $Mg(OH)_2$ is achieved.

In yet another embodiment, the intermediate product obtained in step (vii) is washed with water and filtered to remove calcium chloride as insteps (viii) & (ix).

In yet another embodiment of the present invention, the filtration operation followed by washing of steps (viii) & (ix) could be carried out with ease on a Nutsche filter or rotary disk filter or filter press.

In yet another embodiment of the present invention, the filtration is found to be rapid.

In yet another embodiment of the present invention, the calcination operation of step (x) was carried out in a muffle furnace at 900° C. for 2-3 hours and preferably by gradually ramping the temperature.

In yet another embodiment of the present invention, the MgO has a purity of 98.0-98.9% when produced directly from the end bittern of step (iii) and a purity in the range of 99.1-99.7 when prepared from crystallized or recrystallized $MgCl_2.6H_2O$ of step (iv). In yet another embodiment of the present invention, the MgO obtained from end bittern of step (iii) has a $B_2O_3$ impurity level of 0.10-0.12%, while the level is 0.060-0.080% when prepared from crystallized $MgCl_2.6H_2O$ of step (iv), and 0.010-0.015% when prepared from recrystallized $MgCl_2.6H_2O$ In yet another embodiment of the present invention, the $B_2O_3$ level in MgO can be made still lower through appropriate treatment either of the precursor $Mg(OH)_2$ or of the MgO itself.

In yet another embodiment, the lime used in step (v) is either hydrated lime or quicklime in the form of a solid or solid suspension.

In yet another embodiment, the solution of steps (vi) and (ix) contains 20-30% $CaCl_2$ and it can be used directly in the desulphatation reaction of step (i) or it can be clarified through filtration and/or addition of acid to redissolve $Mg(OH)_2$ prior to executing step (i) or making other use of it if desulphatation of bittern is not required.

An inventive step of the present invention lies in the preparation of magnesia from magnesium chloride via intermediate formation of magnesium hydroxide on its reaction with alkali or hydrated lime. The filtered cake or unfiltered paste of magnesium hydroxide is subsequently converted into MgO through light calcination followed by washing with water and filtration to remove adhering impurities with greater ease than conventional process of washing the precipitated magnesium hydroxide prior to calcination.

In view of the preferred embodiments described above, the main object of one embodiment of the present invention is to provide an improved process for the preparation of magnesia from crude magnesium hydroxide wherein the crude magnesium hydroxide in the form of a filtered cake or unfiltered paste is first converted into MgO through light calcination and the mass is then washed and filtered to remove adhering impurities with greater ease than possible in the conventional process of washing precipitated magnesium hydroxide free of impurities prior to calcination.

Yet another object is to produce crude magnesium hydroxide in the form of filterable slurry.

Yet another object is to obtain magnesium hydroxide in the form of a paste or solid-like dough that can be subjected to drying and light calcination directly without recourse to any filtration.

Yet another object is to produce such crude magnesium hydroxide from the reaction between $MgCl_2$ and alkali with or without the use of $Mg(OH)_2$ as seed.

Yet another object is to conduct the reaction either at room temperature or elevated temperatures to ensure adequate mixing of mass during reaction.

Yet another object is to use a sigma mixer or dough kneader-instead of a conventional reactor-for promoting reaction between $MgCl_2$ and alkali in the semi-solid mass.

Yet another object is to make the mass more filterable after light calcination at 600-900° C.

Yet another object is to exploit the relative thermal stability of calcium chloride in the temperature domain of light calcination so as to obtain a mixture of MgO and $CaCl_2$ during light calcination of the crude $Mg(OH)_2$.

Yet another object is to simultaneously convert adhering $MgCl_2$ into MgO and HCl vapor in the process of light calcination.

Yet another object is to treat the lightly calcined mass with required quantity of water to disintegrate the lumps spontaneously and dissolve the soluble salts wherein the resultant slurry becomes easily filterable.

Yet another object is to ensure that the temperature rise during treatment of lightly calcined mass with water is maintained at 50° C. to minimize rehydration of MgO.

Yet another object is to show that even when rehydration occurs to some extent, filterability of the mass remains superior than of the precipitated $Mg(OH)_2$.

Yet another object is to show that the MgO does not in any manner occlude the salts irreversibly as a result of which the MgO can be readily washed free of the salts.

Yet another object is to wash the MgO free of salts and to further treat with water containing suitable additives to reduce the boron impurity in MgO.

Yet another object is to debottleneck the production of MgO by speeding up the rate determining operation, namely the washing of $Mg(OH)_2$, by not washing crude $Mg(OH)_2$ at all and instead washing lightly calcined crude MgO with much greater degree of ease.

Yet another object is to conserve on use of fresh water.

Yet another object is to obtain $CaCl_2$ in the form of a concentrated solution when the precipitation reaction is conducted with lime.

Yet another object is to use the concentrated $CaCl_2$ solution for desulphatation of bittern to ensure a sulphate-free $MgCl_2$ raw material.

Yet another object is to recalcine the purified MgO at 900-1100° C. to produce caustic calcined MgO, or at still higher temperatures to produce dead burned or sintered magnesia.

Still another object is to use the lightly calcined MgO directly after washing, filtering and drying in applications where some degree of hydrolysis of MgO-that may occur during washing-can be tolerated, e.g., for briquette preparation prior to sintering or for preparation of milk of magnesia.

Still another object is to obtain MgO effortlessly without compromising on its purity.

In addition to descriptions of preferred embodiments and objects of those embodiments, there are a number of observations that may be made. These observations may help to assist in the understanding of the embodiments of the present invention.

(1) Recognizing that the main drawback of MgO production from $Mg(OH)_2$ is the poor filterability of the latter due to its colloidal nature. This makes purification of the $Mg(OH)_2$ a time consuming affair and demanding in terms of the volume of fresh water required per ton of MgO.

(2) Recognizing that when the goal is MgO, there is no need necessarily to purify the precursor $Mg(OH)_2$.

(3) Observing that aqueous slurry of pure MgO is easier to filter than aqueous slurry of pure $Mg(OH)_2$.

(4) Observing that whereas the initial product mixture is relatively easy to filter, the filtration process becomes increasingly tedious as the $Mg(OH)_2$ becomes more and more free of salt.

(5) Concluding from the available literature that rehydration of MgO is a facile process at high temperature and pressure but less so under ambient conditions although some amount of $Mg(OH)_2$ formation undoubtedly occurs as evident from the examples of the present invention. Reasoning thereafter that temperature rise during leaching of salts from the calcined MgO mass can be controlled by cooling the calcined mass to room temperature and adding adequate volume of water to minimize temperature rise.

(6) Reasoning thereafter that if crude $Mg(OH)_2$ is lightly calcined and treated with water, then adhering $MgCl_2$ would get converted into MgO to increase MgO yield, while the residual salts in MgO (NaCl and $CaCl_2$ when precipitation is carried out with NaOH and lime, respectively) will dissolve in the water unless occluded in MgO and the mass should be more easily filterable using the logic of (3) and (5) above. When ammonia is used as the precipitating agent, the by-product $NH_4Cl$ would sublime away even under the conditions of light calcinations and there would be no need of any manner of purification whatsoever.

(7) Hypothesizing that even if the crude MgO of (6) above is in the form of lumps, such lumps should spontaneously disintegrate once contacted with water to yield a slurry which would avoid the need for any grinding of the material and yet would provide the intimate contact necessary for washing away the soluble matter in MgO.

(8) Performing experiments to demonstrate that what is hypothesized in (6) and (7) above are indeed true and the crude MgO lumps require no grinding and can be more easily purified than the precursor $Mg(OH)_2$.

(9) Taking advantage of the post calcinations purification process to reduce not only soluble salts but also $B_2O_3$ through use of additives incorporated in the washing solution.

(10) Realizing that the greatest advantage in operating the invention is the feasibility of producing crude $Mg(OH)_2$ in the form of a dough which can be directly dried and calcined thereby avoiding filtration altogether while at the same time helping to conserve water and increase throughput.

(11) Proving the concept of (10) by making $Mg(OH)_2$ from the reaction of solid hydrated lime (obtained by purifying lime slurry through hydrocycloning, dewatering the slurry and recycling the lime water for preparation of more lime slurry thereby conserving water as well) and a highly concentrated hot solution of $MgCl_2$-rich end bittern promoted by mixing in a jacketed sigma mixer.

(12) Recognizing that if solid $MgCl_2.6H_2O$ is crystallized out from bittern to increase its purity, then such solid can be melted in the sigma mixer and reacted with upgraded and dewatered lime slurry under hot conditions to produce a dough like mass which can be further dried prior to calcinations or directly subjected to calcinations followed by purification of the mass as outlined in (6) and (7) above.

(13) Extending the concept to other bases such as NaOH and dolime.

(14) Using $Mg(OH)_2$ seed to improve the granular nature of the $Mg(OH)_2$ formed from the precipitation reaction.

(15) Proving through recalcination experiments that when the invention is practiced most judiciously, there is virtually no loss on ignition (LOI) during the second calcinations and thereby establishing that it may not be necessary to recalcine the mass after purification with water and instead it can be directly utilized for briquetting and thereafter sintered to yield refractory materials which is the main utility of the MgO.

(16) Also reasoning that the purified mass can be used directly for production of milk of magnesia through pressure hydration as practiced in the prior art.

(17) Recognizing that when precipitation of $Mg(OH)_2$ is carried out with inexpensive lime to make the process cost-effective, further cost-effectiveness can be realized by making use of the by-product $CaCl_2$ for desulphatation of bittern which is required to prevent contamination of magnesia with gypsum.

(18) Recognizing that the calcinations of the $Mg(OH)_2$ to yield crude MgO would enable $CaCl_2$ to be obtained in concentrated solution form during the purification process which would further improve the cost-effectiveness of the desulphatation process as the subsequent evaporation load would be reduced.

The following examples are given by the way of illustration and therefore should not be construed to limit the scope of the invention.

EXAMPLE-1

Figure 1A:
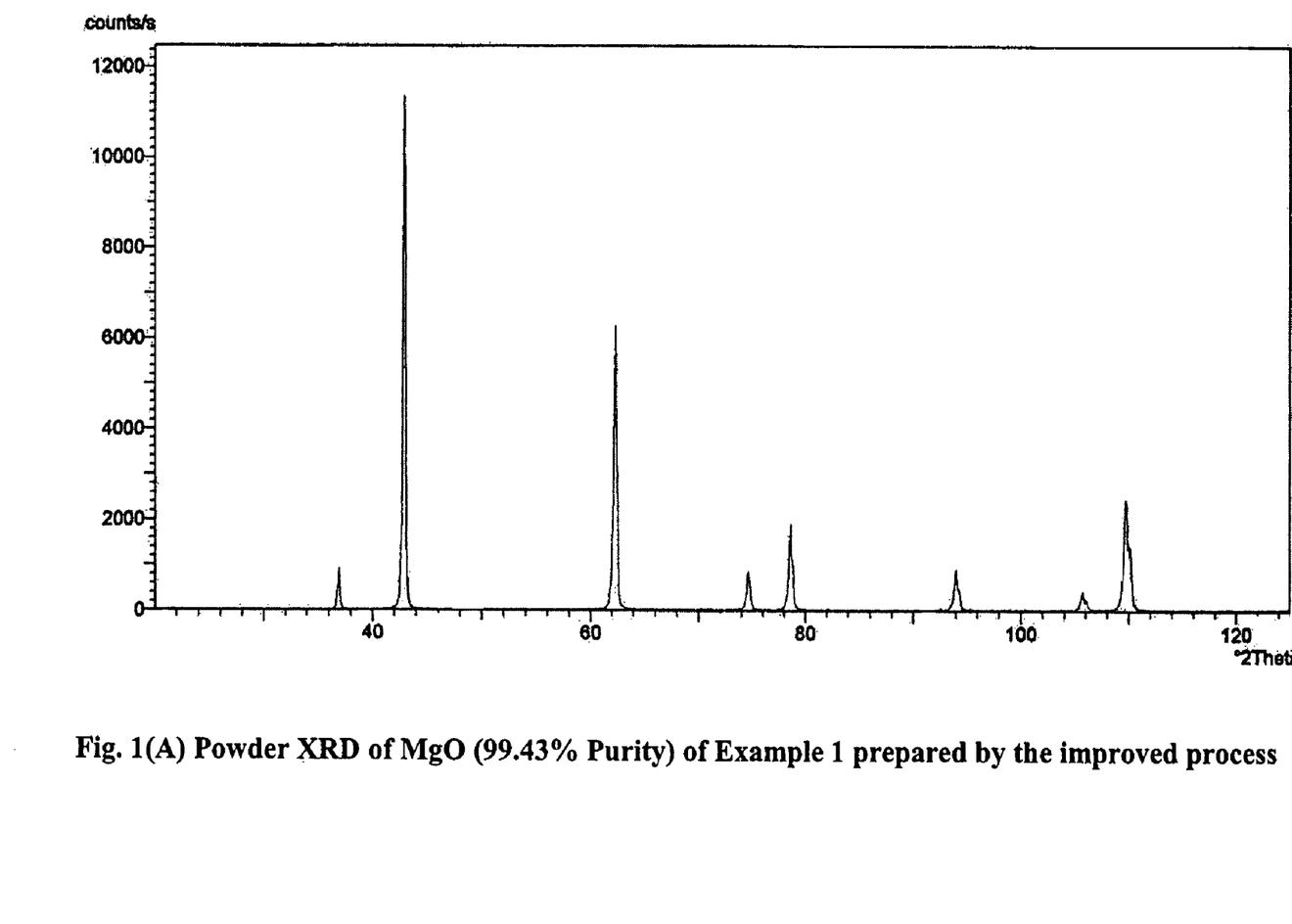
FIGS. 1A and 1B are X-Ray Diffraction (XRD) analysis graphs of the MgO powder produced in Example 1.
Figure 1B:
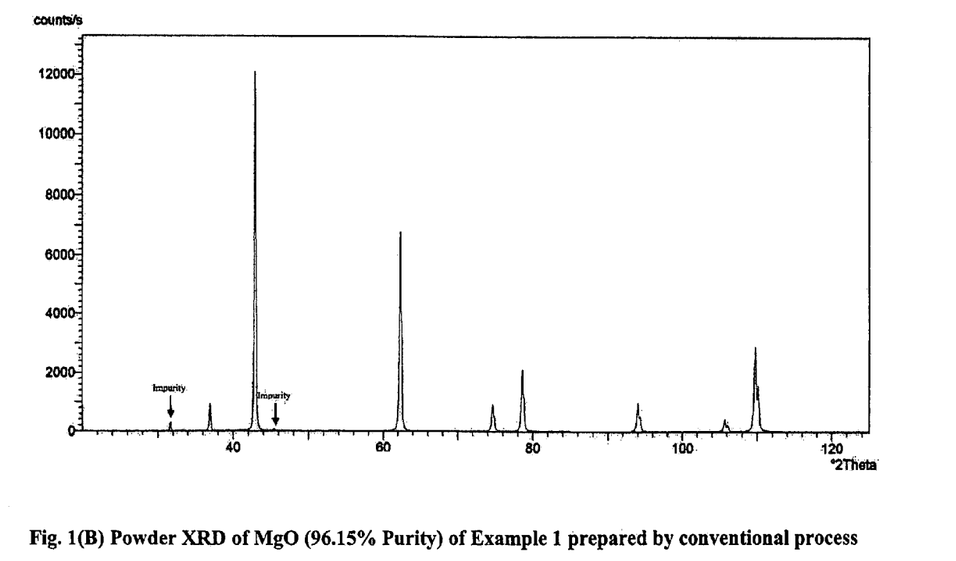

1 L (4.79 moles of $MgCl_2$) of end bittern having specific gravity of 1.324 and chemical composition Ca=0.504% (w/v), Mg=11.50%, $SO_4$=ND, Na=0.41%, K=0.4%, $B_2O_3$=0.032 was partially evaporated by forced evaporation to reduce its volume to 800 ml. The resultant mass was cooled to room temperature followed by filtration to obtain 619.7 g crystalline magnesium chloride having chemical composition, Ca=0.22%, Mg=11.17%, $B_2O_3$=0.0147% and 370 ml of filtrate having specific gravity 1.338 and $B_2O_3$=0.0657%. 100 g (0.465 moles $MgCl_2$) of the solid product was added into an NaOH solution (37 g NaOH of 98% purity in 50 mL water) and mixed under stirring. The temperature rose to 88° C. and the consistency became semi-solid. 147 g of the total of 182.7 g of reaction mass was taken for further processing. Of this 147 g, 100 g was directly calcined at 600° C. to obtain 41.28 g of calcined mass which was then treated with 50 mL water. The lumps crumbled and a uniform slurry was spontaneously formed within 5 minutes. This was filtered on a 2.5" dia. Buchner funnel. The mass was then subjected to three cycles of washing and filtration (2×50 mL+1×75 mL) of which the middle cycle was given with 1% additive to reduce boron impurity. Total filtrate volume was 213 mL while the total filtration time was 25-30 minutes. The wet cake weighing 23.64 g was dried in an oven at 110° C. to 14.15 g of dry mass which was calcined at 900° C. in a muffle furnace to yield 9.67 g of MgO (I.e., 31.7% loss on ignition) having 99.43% purity (see powder XRD in FIG. 1A). The remaining 47 g of reaction mass was dispersed in 50 mL water and then filtered. It was then subjected to three cycles of washing and filtration (3×25 mL) to yield a total of 137 mL of filtrate, the total filtration time being 90-100 mins. The wet cake weighing 19.14 g was dried in an oven at 110° C. to yield 6.92 g of dry mass which was calcined at 900° C. in a muffle furnace to yield 4.59 g of MgO (33.7% loss on ignition) having 96.15% purity (see powder XRD in FIG. 1B). It can be seen from this example that even though the Buchner funnel used was the same in both cases it took one third to one fourth of the time to filter the slurry in the case where the mass was initially calcined and then washed. Since two third of the total reaction mass was processed in this manner, i.e., the filter bed was twofold thicker and water volume for washing was twofold higher, the actual speeding up of filtration is even more pronounced. It can further be seen that the process of the present invention yielded MgO of higher purity.

EXAMPLE-2

25 g of AR grade $MgCl_2.6H_2O$ (0.122 moles) having 99% purity was thoroughly mixed with 9.5 g of hydrated lime (0.122 moles) [$Ca(OH_2)$=95% assay] to form wet pasty solid mass having weight 34 g which on drying at 100-110° C. for two hours yielded 28.31 g dry mass. The loss on drying was 16.73%. This dried mass was calcined at 600° C. for two hours and after calcinations, 15.87 g of calcined material, giving a loss on ignition 43.94%, was collected. This calcined mass was subjected to wash with water, successively three times, to recover maximum amount of calcium chloride, simultaneously purifying the product also. In the first wash of 25 mL, the $CaCl_2$ concentration was found to be 40.8%, recovering 10.2 g (0.092 moles) of $CaCl_2$ which was 75.4% of the expected amount of calcium chloride (expected amount based on hydrated lime is 13.54 g; 0.122 moles). In all total 0.2 L of wash water was used for washing operation thus recovering total 11.8 g (0.106 moles; 87.1% yield) of $CaCl_2$. As in the case of Example 1, filtration was much more facile than in the conventional process of purification of $Mg(OH)_2$. The washed wet cake was calcined at 900° C. for two hours to obtain 3.89 g (0.095 moles; 77.9% isolated yield) of calcined magnesium oxide, having chemical composition: MgO=98.80%, and CaO=1.53%. This example shows that the washing of the intermediate calcined product at 600° C. facilitates the washing and filtration without compromising on product quality. Moreover, the $CaCl_2$ could be obtained in highly concentrated form which would be beneficial for desulphatation as the subsequent evaporation load would reduce.

EXAMPLE-3

0.10 L (0.479 moles of $MgCl_2$) of the end bittern of Example 1 was mixed under stirring with 30 g [0.385 moles of $Ca(OH)_2$] of hydrated lime having assay 95% w/w (80.3% of the stochiometric requirement for $Mg(OH)_2$ formation). The resultant slung was filtered under vacuum, which was slow. Wet cake weighing 95.12 g and 45 mL of filtrate having chemical composition: $CaCl_2$=30.06%, [total 13.53 g (0.122 moles) $CaCl_2$], Mg=2.94% were collected. Out of the total 42.73 g (0.385 moles) assumed $CaCl_2$ formation, (based on hydrated lime addition), 31.6% of $CaCl_2$ was obtained in this filtrate. Wet cake was calcined at 600° C. for three hours and 46.1 g of calcined material was obtained. The calcined material easily disintegrated in 70 mL of water. 62 mL of filtrate having 35% $CaCl_2$ concentration and total 21.73 g (0.196 moles) of $CaCl_2$, was obtained, which was 50.9% of the expected amount of calcium chloride. Another three washings, each of 50 mL (total 150 mL) were repeated using additive in 1% concentration to minimize boron impurities in the product. 144 nL of filtrate containing total 4.7 g $CaCl_2$ (0.042 moles of $CaCl_2$) was obtained. The overall recovery of $CaCl_2$ was 39.96 g, (0.36 moles) which was 93.5% of expected one. Filtration in each washing was found to be facile. Washed wet cake weighing 40.5 g was dried in an oven at 100-110° C. for two hours and 16.88 g dried material was obtained. This was calcined at 900° C. for two hours to obtain 13.60 g (0.329 moles) calcined MgO, with 19.43% loss, having composition: MgO=96.65%, CaO=2.04% and Boron as $B_2O_3$=0.0312%. The recovery of MgO with respect to hydrated lime is found to be 85.45%. This example indicates that the end bittern can be utilized for preparation of MgO with one additional filtration step for obtaining cake for intermediate calcinations. The boron content of the product can be reduced through washing with additive.

EXAMPLE-4

2.0 L of end bittern (9.58 moles of $MgCl_2$) as per the composition in example 1 above was heated to evaporate water up to 150° C. to reduce the volume to 1.2 L. The hot bittern was taken in a Sigma mixer in which 0.725 kg (8.81 moles; 92% of stoichiometric requirement for $Mg(OH)_2$ formation) of commercial hydrated lime having $Ca(OH)_2$=89.9% (w/w) was added and mixed well for half an hour to form a pasty mass. Out of total 2.573 kg pasty mass expected assuming no loss of weight, 0.305 kg was dried in an oven at 110° C. to obtain 0.27 kg of dried material was calcined at 600° C. for two hours to yield 0.215 kg calcined mass. The calcined material was cooled to room temperature and treated with 0.15 L of water and thereafter washed with an additional 0.75 L of water in lots. The wet cake was dried and calcined at 900° C. to get 61.27 g of calcined MgO (1.44 moles) having chemical composition MgO=93.95%, CaO=2.488%, Cl=1.768%, Boron as $B_2O_3$=0.107%.

EXAMPLE-5

Figure 2:
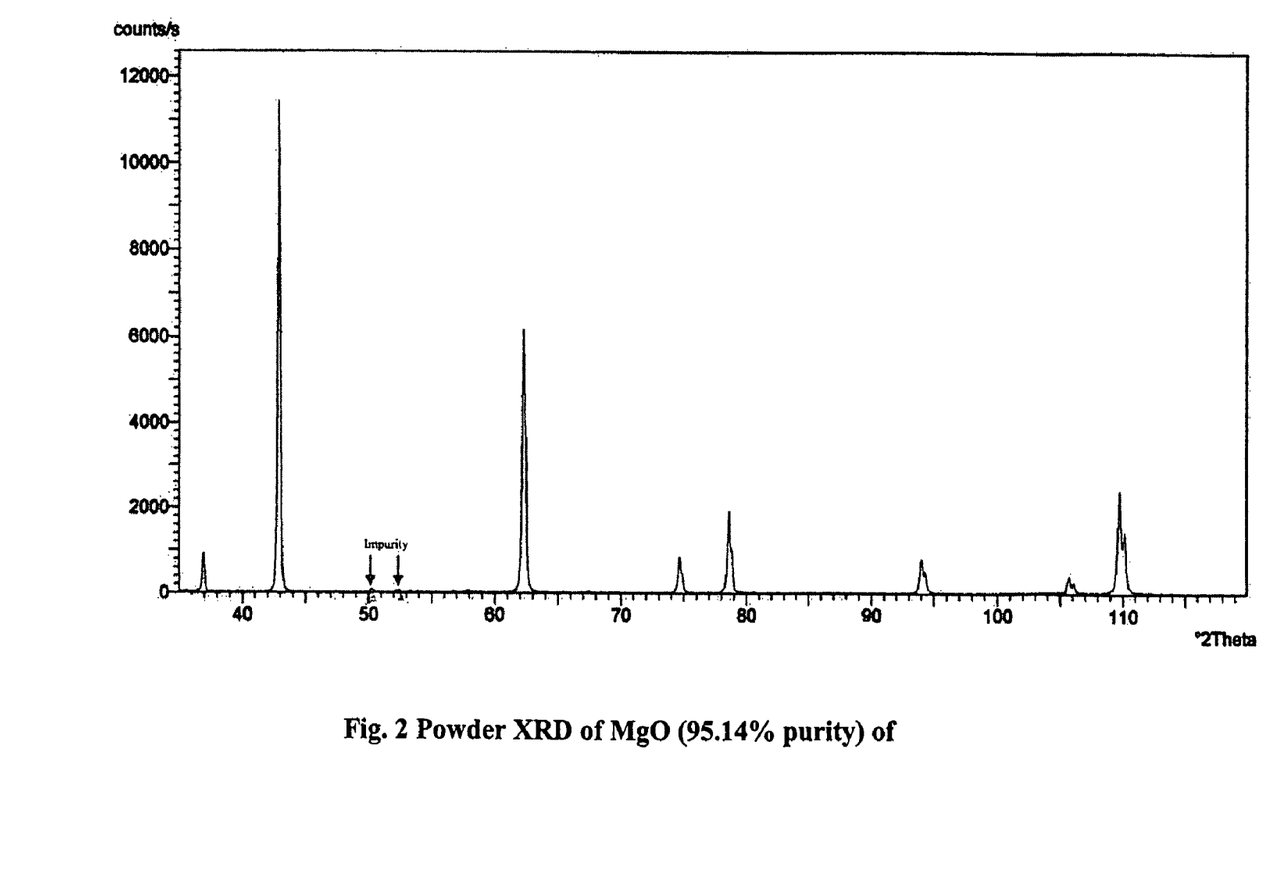
FIG. 2 is an X-Ray Diffraction (XRD) analysis graph of the MgO powder produced in Example 5.

10 L of end bittern containing 115 $gL^{-1}$ Mg was evaporated which on cooling gave 7 kg of solid mass. 2 kg of the solid containing 0.329 kg Mg (1.285 kg $MgCl_2$) was taken along with 0.7 L of water and heated at 150° C. to obtain a hot solution which was poured into a ribbon blender. 0.972 kg (94% of stoichiometric requirement for $Mg(OH)_2$ formation) of powdered hydrated lime (prepared from quicklime by slaking followed by hydrocycloning) was added into the blender and the contents were thoroughly blended. After ca. 30 minutes the pH was found to be around 8-9 indicating completion of the reaction and the blending was stopped yielding a pasty mass. Out of the total 3.672 kg of pasty mass expected assuming no loss of weight, 1 kg was dried at 110° C. for two hours in an electric oven to obtain 0.845 kg of dry mass. The material was then calcined in the form of lumps at 600° C. for two hours in an electric muffle furnace to get 0.481 kg of solid (expected amount=0.52 kg for MgO+$CaCl_2$). 0.24 kg of the calcined mass was cooled to room temperature and then added into 0.45 L of water at room temperature. The solid lumps of calcined solid began to crumble yielding a warm slurry (50° C.). The slurry could be easily filtered on a Buchner funnel to obtain 0.275 L of filtrate containing 29.4% $CaCl_2$. The wet cake was washed successively with 3×0.300 L of water and in each case filtration was found to be facile. The final washing contained 1.2% $CaCl_2$. The cake was then dried and recalcined at 900° C. to yield 0.068 kg of MgO having the following analysis: MgO=95.14% (see powder XRD in FIG. 2). CaO=1.435%, Cl=0.477%. With recycle of the washings, the requirement of fresh water is 6-8 L/kg of MgO and all of the washings can be made to have a high $CaCl_2$ concentration (20-40%) which is beneficial for cost-effective desulphatation of bittern.

EXAMPLE-6

Figure 3:
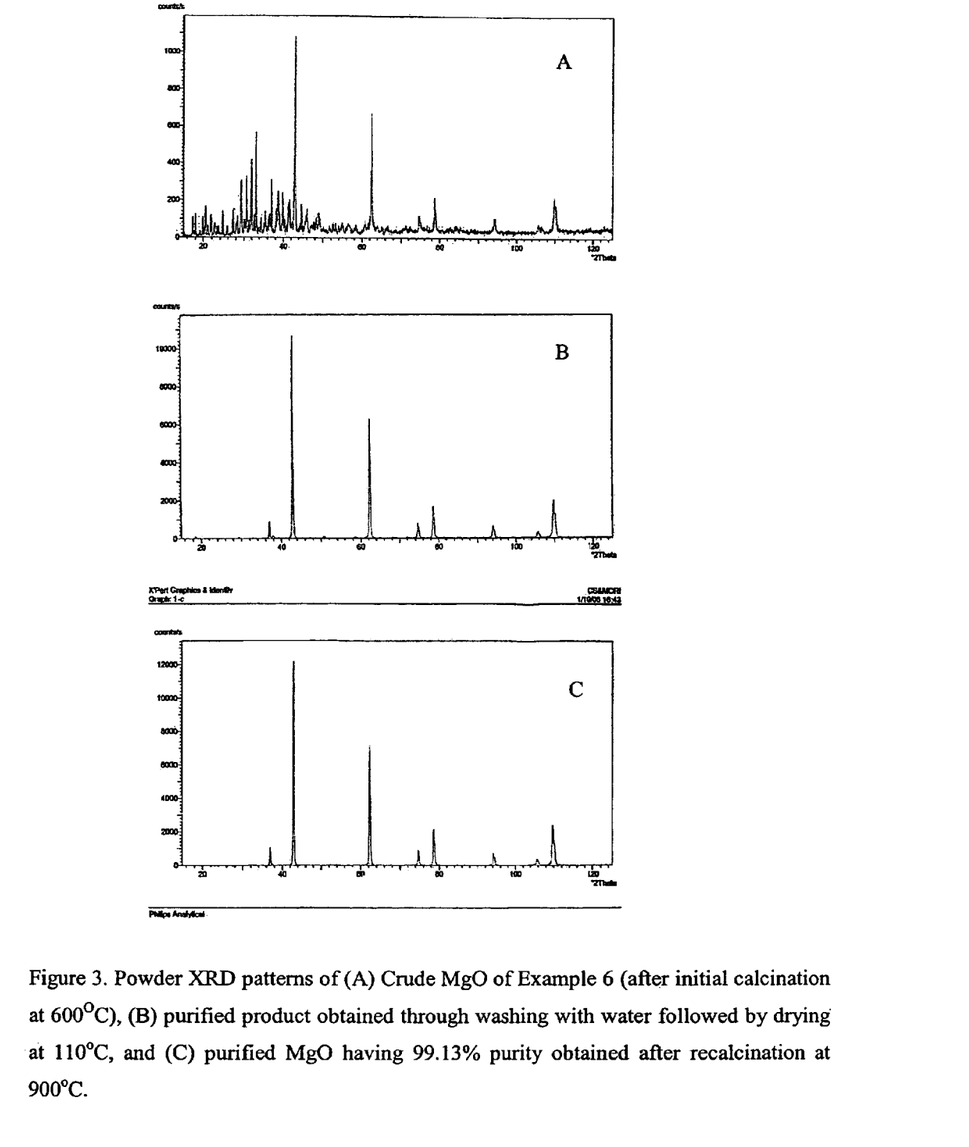
FIGS. 3A, 3B and 3C are X-Ray Diffraction (XRD) analysis graphs of the crude and purified MgO powder produced in Example 6.

1 L of end bittern of Example 5 was heated to evaporate water. When the volume became 800 mL heating was stopped and the solution allowed to cool to room temperature whereupon 587 g solid $MgCl_2.6H_2O$ and 362 mL of 36.7° Be' bittern was obtained. 200 g of the solid (0.954 mol Mg) was heated to 115° C. to liquefy the mass and into this 3 g of $Mg(OH)_2$ seed was added under stirring followed by addition of AR grade lime cake [60.51 g (0.817 mol) in 60.5 mL water] in lots over 3 minutes. After addition of lime temperature was recorded as 100° C., the contents were fairly fluid, and heating was stopped. The mass was stirred for an additional 15-20 minutes and by the time it reached room temperature the appearance was pasty. This pasty mass (303.7 g; pH ca. 8) was dried in an oven at 150° C. and thereafter calcined at 600° C. (see powder XRD of FIG. 3A). The calcined mass (126 g) was air cooled to room temperature and then contacted with 200 ml of water whereupon the temperature rose to 64° C. (this temperature rise was mainly due to the hydration and dissolution of fused $CaCl_2$ as proved separately by experiments with pure fused $CaCl_2$). The slurry was easily filtered to yield $CaCl_2$ solution containing 32.3% $CaCl_2$ and the residue was also easily washed with 50×2 mL deionized water, then dried at 110° C. (see powder XRD of FIG. 3B) and part of the mass was calcined at 900° C. (see powder XRD of FIG. 3C). For 11.0 g of dry mass, 10.8 g of calcined mass having 99.13% purity (only 0.66% CaO impurity) was obtained. It can be seen from the powder XRD profiles of FIGS. 3B and 3C that these are virtually identical, suggesting that the mass remains mainly in the form of MgO even after subjecting it to purification through washing with water, which is in line with the extremely low (1.8%) LOI (loss on ignition).

The above examples illustrate various manners of application of embodiments of the invention, particularly as applied to semi-solid reaction mass wherein raw materials are utilized in their most concentrated forms, otherwise not feasible through the conventional technology. The examples also illustrate the advantages in terms of improved filterability and conservation of water, without compromising on MgO quality.

Examples 5 and 6 also illustrate how rock-like mass crumble and disperse easily on contact with required quantity of water without any need of grinding or agitation. Example 6 also illustrates that the calcinations of $Mg(OH)_2$ at 600° C. not only yields MgO having good filterability but also yields fused calcium chloride which is readily water soluble and yields a high concentration of aqueous $CaCl_2$. Example 6 also illustrates that crude calcined MgO produced by lime route remains largely unaffected during the purification process with water and does not convert into $Mg(OH)_2$ to any significant extent. Example 6 also illustrates that through the method of the invention it to possible to achieve >99% pure MgO using crystallized $MgCl_2.6H_2O$, and inexpensive lime after upgradation.

One advantage of the preferred embodiment of the invention is the avoidance of the tedious process of purifying $Mg(OH)_2$.

Another advantage is that reaction mass even in the form of paste or dough can be handled.

Another important advantage is the conservation of fresh water.

Yet another advantage is the minimum formation of waste.

Yet another important advantage is increased throughput as a result of use of reactants in more concentrated form and speeding up of the rate determining step, namely purification of $Mg(OH)_2$.

Yet another advantage is the spontaneous disintegration of calcined lumps of MgO which eliminates the need for grinding.

Yet another advantage is that the $CaCl_2$ in crude MgO exists in the form of fused $CaCl_2$ which is readily soluble in water and yields a $CaCl_2$ solution having 35-40% (w/v) concentration, which helps conserve water and also improves the economics of bittern desulphation.

Yet another advantage is the achievement of facile process of MgO preparation without compromising on product quality.

We claim:
1. A process for the preparation of MgO, the process comprising the steps of:
   a. desulphating brine or bittern with CaCl2;
   b. evaporating the clarified brine/bittern after separation of gypsum to separate out the common salt and carnallite ($KCl.MgCl_2.6H_2O$);
   c. recovering $MgCl_2$ rich and other salt free end bittern from step (b);
   d. evaporating the end bittern of step (c) to obtain crystalline $MgCl_2.6H_2O$;
   e. mixing $MgCl_2.6H_2O$ with seeds of $Mg(OH)_2$, followed by treating with alkali or hydrated lime/lime slurry to obtain by precipitation reaction a crude Mg(OH)2 paste/slurry;
   f. filtering the resultant paste/slurry to obtain crude $Mg(OH)_2$ and calcium chloride,
   g. drying the crude unwashed and unpurified $Mg(OH)_2$ paste comprising calcium chloride, followed by calcining to convert $Mg(OH)_2$ into MgO, and converting adhering $MgCl_2$ into MgO and HCl gas;
   h. treating the calcined mass of MgO with water to crumble the lumps and thereby dissolving calcium chloride and other soluble salts in water to obtain a MgO slurry;
   i. filtering the MgO slurry, followed by washing the residue with water to make a wet cake substantially free from impurities;
   j. drying the resultant MgO and recalcining it to obtain a purified MgO; and
   k. using the $CaCl_2$ solution filtrate obtained in steps (f) or (i), for desulphatation of brine or bittern in step (a) if lime is used in step (e).

2. A process as claimed in claim 1, wherein bittern is used in step (a) and the bittern is obtained from ocean brine, sea brine, sub-soil brine or lake brine.

3. A process as claimed in claim 1, wherein the bittern is used in step (a) and the bittern is desulphated in the density range of 29-32° Be'.

4. A process as claimed in claim 1, wherein the carnallite ($KCl.MgCl_2.6H_2O$) obtained in step (b) of claim 1 is crystallized between 32-36° Be' either through solar or forced evaporation and the end bittern of step (c) of claim 1 having density of 35.5-36.0° Be' comprises between 450-460 $gL^{-1}$ of $MgCl_2$, 5-10 $gL^{-1}$ of NaCl, 5-10 $gL^{-1}$ of KCl, 5-15 $gL^{-1}$ of Ca, 0-5 $gL^{-1}$ of sulphate, 6-7 $gL^{-1}$ of $Br^-$, and 0.02-0.04% $B_2O_3$.

5. A process as claimed in claim 1, wherein the end bittern of step (c) of claim 1 is debrominated to recover bromine and simultaneously reduces the $Br^-$ impurity in the debrominated bittern to less than 0.5 $gL^{-1}$.

6. A process as claimed in claim 1, wherein the end bittern of step (c) of claim 1 is evaporated in step (d) of claim 1 to reduce the volume by 20-25% so as to crystallize out the $MgCl_2.6H_2O$ in 60-80% yield.

7. A process as claimed in claim 1, further comprising recovering soluble magnesium from the bittern.

8. A process as claimed in claim 1, wherein the alkali or hydrated lime/lime slurry used in step (e) is lime, caustic soda, ammonia, or combinations thereof.

9. A process as claimed in claim 1, wherein lime is used in step (e) and the lime is quicklime, hydrated lime, dolime in solid or slurry form, or combinations thereof.

10. A process as claimed in claim 1, wherein hydrated lime is used in step (e) and the hydrated lime is prepared by slaking of quicklime followed by cycloning and dewatering to yield upgraded solid hydrated lime and lime water that can be reused for slaking of a fresh batch of quicklime.

11. A process as claimed in claim 1, wherein a stoichiometric equivalent of alkali is used in step (e) in the range of 0.8-1.0.

12. A process as claimed in claim 1, wherein the amount of $Mg(OH)_2$ seed used in step (e) of claim 1 is in the range of 0-10% mole for mole of magnesium salt taken.

13. A process as claimed in claim 1, wherein the temperature of the precipitation reaction in step (e) of claim 1 is in the range of 20-120° C.

14. A process as claimed in claim 1, wherein a reaction time used in the precipitation reaction in step (e) of claim 1 is in the range of 5-90 minutes under intimate mixing conditions.

15. A process as claimed in claim 1, wherein drying of the paste obtained in step (f) of claim 1 is carried out at 70-120° C. in conventional ovens or through solar drying.

16. A process as claimed in claim 1, wherein the calcination operation in step (g) of claim 1 is carried out at a temperature in the range of 500-1000° C.

17. A process as claimed in claim 16, wherein the temperature is in the range of 600-900° C.

18. A process as claimed in claim 16, wherein the calcination operation is carried out in a muffle furnace or rotary calciner or vertical kiln depending on the physical form of the dry matter.

19. A process as claimed in claim 1, wherein the calcination operation in step (g) of claim 1 converts adhering $MgCl_2$ into MgO with concomitant release of HCl vapour and $CaCl_2.2H_2O$ into fused $CaCl_2$ that is hydrated with release of heat and provides the driving force for the disintegration of the crude mass and also the rapid solubilisation of the $CaCl_2$.

20. A process as claimed in claim 1, wherein the water used in step (h) of claim 1 comprises recycled washings from previous batches and the amount of water taken is sufficient to dissolve all soluble salts in the MgO, and wherein the temperature of the slurry is controlled at a temperature in the range of 40-90° C., for the higher solubility of salts such as $CaCl_2$ at higher temperature and to minimize the hydrolysis of MgO.

21. A process as claimed in claim 20, wherein the temperature is controlled in the range of 55-65° C.

22. A process as claimed in claim 1, wherein the water used in steps (h) and (i) of claim 1 comprises additives to remove boron impurities in MgO.

23. A process as claimed in claim 1, wherein the washing and filtration operations of step (i) of claim 1 are expedited 2-5 fold as a result of the improved filterability of the lightly calcined MgO vis-á-vis $Mg(OH)_2$.

24. A process as claimed in claim 1, wherein the requirement of water for purification of the calcined mass in step (i) of claim 1 is reduced by a factor of 2-5 fold as a result of the improved filterability of the lightly calcined MgO vis-á-vis $Mg(OH)_2$.

25. A process as claimed in claim 1, wherein the wet cake obtained in step (g) of claim 1 is useful for the preparation of milk of magnesia.

26. A process as claimed in claim 1, wherein the wet cake obtained in step (i) of claim 1 is dried to yield MgO or recalcined at a temperature in the range of 500-2200° C. to obtain the desired product.

27. A process as claimed in claim 1, wherein the operations of steps (h) and (i) of claim 1 are not required when alkali is used in step (e), the alkali is ammonia and the calcination operation of step (g) removes all impurities to yield highly pure MgO.

28. A process as claimed in claim 1, wherein the purity of MgO obtained is greater than 99%.

* * * * *